(12) United States Patent
Lawrence et al.

(10) Patent No.: US 12,151,189 B2
(45) Date of Patent: Nov. 26, 2024

(54) PRIMARY FRACTIONATOR WITH REDUCED FOULING

(71) Applicant: ExxonMobil Chemical Patents Inc., Baytown, TX (US)

(72) Inventors: Selma S. Lawrence, Houston, TX (US); Michael Moran, Houston, TX (US); John S. Coleman, Houston, TX (US); Robert S. Bartel, Humble, TX (US); Vikram Singh, Houston, TX (US); Monica Malhotra, Singapore (SG)

(73) Assignee: ExxonMobil Chemical Patents Inc., Baytown, TX (US)

( * ) Notice: Subject to any disclaimer, the term of this patent is extended or adjusted under 35 U.S.C. 154(b) by 311 days.

(21) Appl. No.: 17/422,576

(22) PCT Filed: Feb. 5, 2020

(86) PCT No.: PCT/US2020/016703
§ 371 (c)(1),
(2) Date: Jul. 13, 2021

(87) PCT Pub. No.: WO2020/163421
PCT Pub. Date: Aug. 13, 2020

(65) Prior Publication Data
US 2022/0096955 A1    Mar. 31, 2022

Related U.S. Application Data

(60) Provisional application No. 62/802,371, filed on Feb. 7, 2019.

(30) Foreign Application Priority Data

Jun. 12, 2019    (EP) .................................... 19179676

(51) Int. Cl.
  *B01D 3/14*    (2006.01)
  *B01D 3/32*    (2006.01)
  (Continued)

(52) U.S. Cl.
  CPC ............... *B01D 3/143* (2013.01); *B01D 3/32* (2013.01); *C10G 7/00* (2013.01); *C10G 9/36* (2013.01)

(58) Field of Classification Search
  CPC . B01D 3/143; B01D 3/32; B01D 1/14; C10G 7/00; C10G 9/36; C10G 55/04
  See application file for complete search history.

(56) References Cited

U.S. PATENT DOCUMENTS 5,877,380 A    3/1999  Conroy et al.
6,193,849 B1   2/2001  Lockett, Jr.
(Continued)

FOREIGN PATENT DOCUMENTS

CN    1765455 A    5/2006

OTHER PUBLICATIONS

1994 AIChE Paper Olefin Unit Primary Fractionator: On-Line Petro-Blast Lancing, Authors W. D. Adams and C. R. Rutan of OxyChem, pp. 149-192.
(Continued)

*Primary Examiner* — Renee Robinson (57) ABSTRACT

Systems and methods are provided for reducing or minimizing fouling within the primary fractionator of a pyrolysis reaction system. The reduced or minimized fouling can be achieved in part by providing one or more pump-around trays in the primary fractionator below the level of the fractionation trays for an intermediate product produced by the fractionator. Including a pump-around section below the fractionation trays can improve vapor distribution within the fractionation trays, which are believed to have an increased
(Continued)

likelihood of accumulation of foulant deposits. Optionally, other vapor distribution devices can be included along with the pump-around section.

11 Claims, 3 Drawing Sheets

(51) Int. Cl.
    *C10G 7/00*     (2006.01)
    *C10G 9/36*     (2006.01)

(56) References Cited

U.S. PATENT DOCUMENTS

| | | |
|---|---|---|
| 8,524,070 B2 | 9/2013 | Strack et al. |
| 10,005,004 B2 | 6/2018 | Alzner et al. |
| 2012/0024749 A1 | 2/2012 | Strack et al. |
| 2013/0015037 A1 | 1/2013 | Zhao |
| 2014/0061100 A1 | 3/2014 | Lattner et al. |
| 2014/0183027 A1 | 7/2014 | Abouelhassan |
| 2014/0357923 A1 | 12/2014 | Pavia et al. |
| 2016/0229770 A1 | 8/2016 | Alzner et al. |
| 2016/0376511 A1 | 12/2016 | Srivastava et al. |

OTHER PUBLICATIONS

2002 AIChE Paper "The Definitive Solution: Gasoline Fractionator Retrofit Techniques", Authors Joseph Gondolfe of Stone & Webster and Casey Mueller of Equistar Chemicals, LP, pp. 1-20.

Performance Evaluation and Fouling Mitigation in a Gasoline Fractionator, M. Sprague, et al., Proceedings of AIChE Spring National Meeting, Orlando Florida, (2006), pp. 1-57.

Primary Fractionator Fundamentals and Flexibility to Feedstock, A. Bernard, et al., Proceedings of AICHE Spring National Meeting, Orlando, Florida (2018), pp. 1-33.

"Quench Oil Improvements at an Olefins Unit", 1999 AIChE Spring Meeting, $11^{th}$ Annual Ethylene Producer's Conference Session 64, Paper 64D, Author Jay Milbrath of Equistar Chemicals, LP, pp. 237-251.

PRIMARY FRACTIONATOR WITH REDUCED FOULING

CROSS-REFERENCE TO RELATED APPLICATIONS

This application is a US national phase application of PCT Application Serial No. PCT/US2020/016703 having a filing date of Feb. 5, 2020, which claims priority to and the benefit of U.S. Provisional Application No. 62/802,371 having a filing date of Feb. 7, 2019 and European Patent Application No. 19179676.2 having a filing date of Jun. 12, 2019, the disclosures of all of which are incorporated herein by reference in their entireties.

FIELD

Systems and methods are provided for reducing or minimizing fouling in the primary fractionator of a pyrolysis process train.

BACKGROUND

Steam cracking is a type of pyrolysis process that can be used to convert various types of feeds to form olefinic products. In aspects where the feed for steam cracking corresponds to a liquid feed, fractionation of the steam cracker products is typically performed to separate out higher and lower value portions of the steam cracker products. For example, in addition to light olefins, steam cracker products can include steam cracker naphtha, steam cracker gas oil, and steam cracker tar.

Due to the processing conditions present in a steam cracking environment, chemical species are also created that can potentially cause fouling of structures and/or surfaces within the system. The formation of insoluble polymer or other deposits on interior surfaces is an example of a type of fouling, where radicals formed during steam cracking can react to form polymer deposits. Other fouling mechanisms can also be present. As fouling occurs, deposits can build up on a surface, resulting in obstruction of conduits and/or otherwise reducing performance of various portions of a system. Due to the time, expense, and loss of operating revenue that occurs when a system is shut down to remove accumulated foulant deposits, it would be desirable to provide improved systems and methods that can reduce or minimize fouling within a steam cracking process train.

U.S. Pat. No. 8,524,070 describes a method for processing a hydrocarbon pyrolysis effluent. Instead of using a conventional primary fractionator, a rectifier is used for separation of quench oil from pyrolysis gasoline. The pyrolysis tar in the pyrolysis effluent can be removed by condensation prior to passing the pyrolysis effluent into the rectifier. The method for processing the hydrocarbon pyrolysis effluent is described as reducing fouling, based on removal of pyrolysis tar and/or coke prior to entering the vessel that performs the separation of the quench oil from the pyrolysis gasoline.

U.S. Patent Application Publication 2012/0024749 describes a method for processing hydrocarbon pyrolysis effluent. The method includes using multiple heat exchangers to cool the pyrolysis effluent prior to cooling the effluent while recovering heat from the effluent.

An article by Jay Milbrath, "Quench Oil Improvements at an Olefins Unit", 1999 AIChE Spring Meeting, 11th Annual Ethylene Producer's Conference Session 64, Paper 64D, describes modification made to a primary fractionator in an effort to reduce accumulation of fouling deposits.

SUMMARY

In various aspects, systems and methods are provided for reducing fouling within a primary fractionator of a system for processing a pyrolysis effluent. It has been discovered that pump-around trays have lower susceptibility to formation of foulant deposits within a fractionator, as compared to fractionation trays. Additionally, due to having increased liquid traffic in pump-around trays as compared to fractionation trays, it is believed that pump-around trays can assist with reducing or minimizing radicals within a pyrolysis effluent that is being separated. By including pump-around trays below the fractionation trays in the primary fractionator, fouling within the primary fractionator can be reduced or minimized. Further reduction or minimization can be achieved by locating the fractionation trays at a height where the temperature in the fractionator is sufficiently low to mitigate foulant deposit accumulation. Maintaining a desired temperature at the fractionation trays can be further assisted by withdrawing an intermediate product from the primary fractionator via the fractionation trays during operation.

The pump-around trays can be included in primary fractionators that are associated with a variety of configurations for processing of a pyrolysis effluent. This can include configurations where pyrolysis tar is removed from the pyrolysis effluent either before or after passing the pyrolysis effluent into the primary fractionator. Optionally, in addition to withdrawing liquid for passage through the pump-around loop, a portion of the withdrawn liquid can be used as quench oil for initial cooling of the pyrolysis effluent.

DETAILED DESCRIPTION

All numerical values within the detailed description and the claims herein are modified by "about" or "approximately" the indicated value, and take into account experimental error and variations that would be expected by a person having ordinary skill in the art.

In various aspects, systems and methods are provided for reducing or minimizing fouling within the primary fractionator of a pyrolysis reaction system, such as a steam cracking reaction system. The reduced or minimized fouling can be achieved in part by providing one or more pump-around trays in the primary fractionator below the level of the fractionation trays for the intermediate product produced by the fractionator. An example of an intermediate product is a steam cracker gas oil. Including a pump-around section below the fractionation trays can improve vapor distribution within the fractionation trays, which can be valuable for reducing or minimizing the presence of stagnant zones. Reducing or minimizing stagnant zones can be beneficial because it is believed that the fractionation trays have an increased likelihood of accumulation of foulant deposits.

The presence of a pump-around section can also allow for withdrawal of fractionator feed from a location closer to the bottom of the fractionation tower, cooling of the feed, and then return of the cooled feed to a location closer to the middle of the fractionation tower (i.e., at or near the top of the pump-around section). Contacting of the vapor-phase free radicals with liquid in the pump-around can allow for termination of free radicals within the feed that passes through the pump-around section. (For convenience, the portion of the pyrolysis effluent that is passed into the fractionator can be referred to as a feed into the fractionator.) Additionally or alternately, the location of the fractionation trays (i.e., the intermediate product from the tower) can correspond to a sufficiently low temperature that formation of foulant deposits is further reduced or minimized. Optionally, other vapor distribution devices can be included along with the pump-around section.

It has been unexpectedly discovered that fractionation trays within a conventional primary fractionator can have stagnant zones that facilitate formation of foulant deposits. Such stagnant zones can be present even though a vapor distribution device such as a chimney tray is present below the fractionation zone. Without being bound by any particular theory, it is believed that these stagnant zones associated with fractionation trays can allow for deposit accumulation. By contrast, it is believed that due to the substantially larger amount of liquid traffic within a pump-around tray, the pump-around trays can be more resistant to accumulation of foulant deposits than fractionation trays. Due in part to the high temperatures used during steam cracking and/or pyrolysis, the free radical concentration in the fractionator can be substantially greater than an expected equilibrium concentration at the temperature of the fractionator. This greater than equilibrium concentration of free radicals is believed to contribute to formation of foulant deposits in stagnant zones within the fractionator.

In addition to improving vapor distribution, inclusion of one or more pump-around trays (such as a plurality of pump-around trays) prior to the initial (e.g., lowest) fractionation tray can also provide additional benefits. For example, inclusion of one or more pump-around trays can assist with terminating additional free radicals prior to allowing feed to reach the fractionation trays. The pump-around trays can provide a mechanism to increase the amount liquid traffic within the fractionator, thus allowing additional opportunity for vapor phase radicals to interact with liquid, where free radical termination is more likely to occur. This can also allow free radicals within the portions of the feed that pass into a pump-around loop to spend additional time in a condensed phase, where free radical termination is more likely to occur. Pump-around trays can also provide an opportunity for heat recovery. Such heat recovery can assist with managing the temperature in the fractionation trays. The effluent from a pyrolysis process emerges from the pyrolysis reactor at an elevated temperature. Substantial cooling is required to reduce the temperature of the effluent to a conventional temperature for performing fractionation, and recovery of heat from the effluent during this cooling can reduce or minimize energy costs for the overall pyrolysis process. Using pump-around trays can allow for at least partial heat recovery from the portion of the effluent that is fed into the fractionator.

In various aspects, a pump-around region that includes one or more pump-around trays can be included in the primary fractionator between the feed inlet and the fractionation region. The one or more pump-around trays (such as a plurality of pump-around trays) can correspond to two or more trays, or three or more, or four or more, or five or more, such as up to ten or possibly still more. Depending on the aspect, the temperature in the primary fractionator between the pump-around region and the fractionation region can be 160° C. or less, or 150° C. or less, or 140° C. or less, such as down to 120° C. or possibly still lower. The pump-around region can be located below the intermediate product withdrawal location (i.e., below the first fractionation tray) in the primary fractionator. In various aspects, the temperature of the feed to the primary fractionator can be 300° C. or less, or 250° C. or less, or 200° C. or less, or 160° C. or less, such as down to 140° C. or possibly still lower. Optionally, a plurality of pump-around sections can be included, where each pump-around section can include one or more pump-around trays. In such an optional aspect, a separate pump-around loop can be provided for each pump-around section.

Example of Steam Cracking Configuration

Steam cracking is a type of a pyrolysis process. In various aspects, the feed for pyrolysis, such as the feed for steam cracking, can correspond to any type of liquid feed. Examples of suitable feeds can include whole and partial crudes, naphtha boiling feeds, distillate boiling range feeds, resid boiling range feeds (atmospheric or vacuum), or combinations thereof. Additionally or alternately, a suitable feed can have a T10 distillation point of 100° C. or more, or 200° C. or more, or 300° C. or more, or 400° C. or more, and/or a suitable feed can have a T95 distillation point of 450° C. or less, or 400° C. or less, or 300° C. or less, or 200° C. or less. It is noted that the feed for pyrolysis (such as steam cracking) can be fractionated to remove a bottoms portion prior to performing pyrolysis, so that the feed entering the pyrolysis reactor has a T95 distillation point of 450° C. or less. The distillation boiling range of a feed can be determined, for example, according to ASTM D2887. If for some reason ASTM D2887 is not suitable, ASTM D7169 can be used instead. Although certain aspects of the invention are described with reference to particular feeds, e.g., feeds having a defined T95 distillation point, the invention is not limited thereto, and this description is not meant to exclude other feeds within the broader scope of the invention.

Certain aspects of steam cracking effluent will now be described in more detail with reference to a primary fractionation tower (for simplicity, "fractionator") that has at least four substantially non-overlapping regions. The fractionator is suitable for separating one or more streams from a fractionator feed stream that comprises (i) steam cracker effluent or (ii) a stream derived from a steam cracker effluent, e.g., a tar knock-out drum overhead stream. The invention is not limited to these aspects, and this description should not be interpreted as foreclosing other steam cracker effluent separators within the broader scope of the invention, e.g., those having greater or fewer than four regions.

Typically, the fractionator has the shape of at least one tubular member of substantially-circular internal cross-section, and a vertically-oriented long axis. Although the fractionator can have bottom and top end-caps, and substantially-uniform internal cross-section along its length (e.g., from bottom to top between the end-caps), this is not required. In certain aspects, for example, the fractionator can have a first segment of greater internal cross-sectional area located below a second segment of lesser internal cross-sectional area.

The fractionator can have least four regions, also referred to as "sections". Each of the four regions is located within the internal volume of the tower. Each region is typically of a cylindrical shape. The long axis of each region is substantially coaxial with that of the fractionation column (or "tower"), and each region's cross sectional area is substantially equal to that part of the tower's internal cross sectional area as is available for fluid flow (vapor-liquid and/or vapor-liquid flow) at each increment of the tower's height within which the region is located.

The fractionator's first region (the "lower region") is located in a lower region of the fractionator, typically between the lower end-cap and the pump-around region. The lower region is adapted for receiving steam cracker effluent or a stream derived from steam cracker effluent (e.g., for receiving tar knock-out drum overhead). In these aspects, the lower region does not contain vapor-liquid contacting devices, e.g., this region does not contain structured packing or fractionation trays. The lower region includes at least one opening that is adapted for withdrawing an outlet stream comprising fluid (typically comprising liquid and/or vapor, and optionally further comprising solids) from the fractionator's lower region. For examples, the fractionator can include two such opening, with one located within or proximate to the fractionator's bottom-cap and another located at a height above the first opening but within the lower region. The openings can be positioned at the same angular location along the fractionator's circumference (but at different heights), but this is not required. A portion of fluid within the lower region can be withdrawn for use as a steam cracker quench oil, e.g., as disclosed in US Patent Application Publication No. 2014-0061100, which is incorporated by reference herein in its entirety.

The fractionator's second region (a referred to as the "pump-around" region) is located above the lower region. Although the pump-around region can be located immediately above the fractionator's lower region (e.g., no intervening stages between the lower region and the pump-around region), this is not required. The pump-around region (or "pump-around") is adapted to distribute vapor in fractionator's internal cross-sectional area. To accomplish this purpose, the pump around region can include fractionator internals adapted for vapor-liquid contacting, e.g., one or more sheds, trays and/or packing, such as one or more trays and/or structured packing. Conventional trays can be used, e.g., sieve trays, dual-flow trays, RIPPLE TRAYS™, etc., but the invention is not limited thereto. Examples suitable packing include gauze; structured packings such as Metal Max Pak®, Mellapak®, Flexipac®, Gempak®, Goodloe®, Sulzer®; or random or dumped packing, such as Berl saddles, Intalox® saddles, raschig rings, Pall® rings, and Nutter Rings™. These and other types of suitable gas/liquid contacting equipment are described in detail in Kister. H. Z. Distillation Design, McGraw-Hill, N.Y. (1992), Chapters 6 and 8, the disclosures of which are incorporated herein by reference.

Typically the pump-around region includes at least a first tray group having at least one tray, e.g., a first group that includes a plurality of substantially equally-spaced fractionation trays. The number of trays in the first group is typically in the range of from 1-10, e.g., from 1-6, such as from 2-5. Conventional tray geometries and spacings can be used, e.g., those disclosed in the Kister reference, and/or in P.C.T. Patent Application Publication No. WO2014-193492, which is incorporated by reference herein in its entirety.

Optionally, the pump-around region includes a second group of at least one tray. The second group is located below the first group, i.e., between the bottom of the first group and the bottom end cap of the fractionator. The second group typically includes at least one chimney tray, and in certain aspects only one chimney tray. Since the second tray group is located in the pump-around region, it is positioned above the lower region's outlet that is used for withdrawing an outlet stream from the fractionator.

The fractionator's third region (referred to as the "vapor-distribution" region), is located above the pump-around region. The vapor-distribution region can be adapted to receive via one or more inlets an inlet stream comprising a fluid (typically liquid or a mixture of liquid and vapor). The inlet stream includes at least a portion of the outlet stream that has been withdrawn from the lower-region, and optionally after cooling at least a portion of the outlet stream. The vapor-distribution region can also be adapted to receive vapor from the pump-around region. Optionally, the vapor-distribution region is adapted to further distribute vapor received from the pump-around region. The length of the vapor-distribution region along the fractionator's long-axis (i.e., the height axis, in other words the axis substantially perpendicular to the fractionator's cross section) can be greater than, equal to, or less than that of the pump-around region. For example, the length of the vapor-distribution region can be at least 0.25 times the length of the pump-around region as measured along the fractionator's long axis, such as at least 0.5 times, or at least 0.75 times, or at least 1.0 times, or at least 1.5 times, or at least 2 times, or at least three times, or at least 5 times, or at least 10 times. In certain aspects, the vapor-distribution region has a length that is in the range of from 0.5 times the length of the pump-around region to about 20 times the length of the pump-around region, e.g., from about 1.0 to about 15, or about 1.1 to about 10, or about 1.25 to about 10, or about 1.5 to about 10, or about 2 times the length of the pump-around region to about 10 times the length of the pump-around region.

Although the vapor-distribution region can contain fractionator internals (e.g., vapor-liquid contacting devices such as one or more of sheds, trays and/or packing) within the region's cross-sectional area, this is not required. In certain aspects, the vapor-distribution region contains no fractionator internals, e.g., it can be a substantially empty internal volume except for the inlets used for re-introducing into the fractionator at least a portion of an outlet stream (or cooled outlet stream) that has been withdraw from the lower region.

Besides the benefit of additional liquid-vapor contacting, (i) re-introducing into the vapor-distribution region at least a portion of the withdrawn stream from the lower region, and (ii) using the indicated fractionator internals in the pump-around region, have been found to act together to beneficially increase the distribution of vapor traveling upward through the fractionator's internal cross-sectional area toward the vapor-distribution stage. Doing so is observed to achieve a greater uniformity of upward vapor flow within the internal cross section. The greater uniformity in vapor distribution is evidenced by, e.g., a greater uniformity in vapor velocity within the internal cross section.

In certain aspects the vapor-distribution region is optional. In such aspects, that portion of the fluid stream withdrawn from the lower region (and typically cooled) is introduced at the upper-most position in the pump-around region and/or the lower-most position in the fractionation region. For example, the cooled fluid can be introduced immediately above the upper-most vapor-liquid contact device in the pump-around region and/or immediately below the lowest vapor-liquid contact device in the fractionation region.

The fractionator's fourth region (called the "fractionation region"), and is located above the vapor-distribution region and is positioned to receive vapor (and potentially entrained liquid, solids, and semi-solids too) from the vapor-distribution region. Optionally (but typically) the fractionation region is configured to include at least one outlet. The outlet, when used, is typically configured to withdraw a side stream from the fractionation region, e.g., a stream comprising steam cracker gas oil ("SCGO"). Continuously withdrawing SCGO is observed to lessen fractionator fouling. The fractionation region typically contains fractionation internals, e.g., one or more vapor-liquid contacting devices, e.g., one or more of sheds, trays, and packing. Typically a plurality of trays is located within the fractionation region. One or more side stream outlets can be located above, below, or among the fractionation region internals, e.g., between adjacent trays within the fractionation region.

The length of the fractionation region along the fractionator's long-axis can be greater than, equal to, or less than that of the pump-around region. For example, the length of the fractionation region can be at least 0.25 times the length of the pump-around region as measured along the fractionator's long axis, such as at least 0.5 times, or at least 0.75 times, or at least 1.0 times, or at least 1.5 times, or at least 2 times, or at least three times, or at least 5 times, or at least 10 times the length of the pump-around region. In certain aspects, the fractionation region has a length that is in the range of from 0.5 times the length of the pump-around region to about 5 times the length of the pump-around region, e.g., from about 0.75 to about 3, or about 0.9 to about 10, or about 1.25 to about 10, or about 1.5 to about 10, or about 2 times the length of the pump-around region to about 10 times the length of the pump-around region.

Typically the fractionation region includes at least a first tray group having at least one tray, e.g., a first group that includes a plurality of substantially equally-spaced fractionation trays. The number of trays in the first group is typically $\geq 2$, e.g., $\geq 4$, such as $\geq 6$, or $\geq 8$, or $\geq 10$, or $\geq 15$, or $\geq 20$. For example, the number of trays in the first group can be in the range of from 1-30, e.g., from 1-20, such as from 2-10. Conventional tray geometries and spacings can be used in the fractionation (also referred to as "rectification") region, e.g., those disclosed in in the Kister reference, and/or in P.C.T. Patent Application Publication No. WO2014-193492.

Additional stages can be located above the fractionation stage, e.g., one or more additional fractionation stages, quenching stages, etc. Such stages can be used, e.g., for recovering water carried to the fractionator in the steam cracker effluent, recovering naphtha boiling range hydrocarbon (e.g., pyrolysis gasoline), and recovering a process gas containing light hydrocarbon vapor, e.g., light olefin vapor. Recovered water can be upgraded for use as steam cracker dilution steam. At least a portion of the recovered pyrolysis gasoline can be returned to the fractionator, e.g., as reflux, typically at a location above the fourth region.

Figure 1:
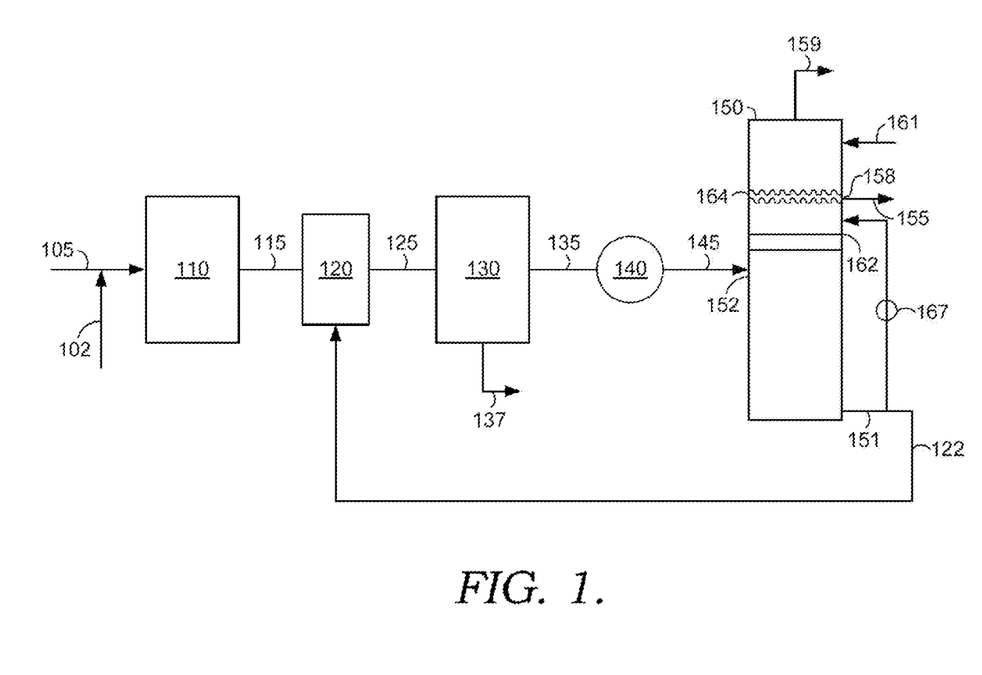
FIG. 1 shows an example of a process train for separation of a steam cracking effluent.

FIG. 1 shows an example of a steam cracking process train or reaction system. The process train shown in FIG. 1 can be used to illustrate the operation of a primary fractionator as described herein, but it is understood that fewer and/or more elements could be present in the process train.

In FIG. 1, a feed 105 is passed into a pyrolysis reactor, such as a steam cracking reactor 110. In the example shown in FIG. 1, any optional removal of bottoms from the feed 105 has already been performed. Optionally, feed 105 can be combined with steam 102 prior to entering the steam cracking reactor 110. The steam cracking reactor 110 can be operated to produce lower molecular weight hydrocarbons, such as $C_2$-$C_4$ olefins. Under such steam cracking conditions, the steam cracking reactor can also produce various fractions, such as steam cracked naphtha, steam cracker gas oil, and steam cracker tar. Additionally, a variety of free radicals can be generated under steam cracking conditions. This can result in part from the greater equilibrium concentration of free radicals that is associated with the high temperature environment within a steam cracking reactor (or other pyrolysis reactor).

The steam cracker effluent 115 from the steam cracking reactor 110 can then be passed into, for example, a quench stage 120 where the steam cracker effluent 115 is indirectly cooled and/or mixed with quench oil to cool the effluent. The quench oil can correspond to, for example, a portion of the bottoms from the primary fractionator 150. The quenched effluent 125 can then be passed into a separator 130, such as a tar knock-out drum, to separate a steam cracker tar product 137 from the remaining (gaseous) separated effluent 135. It is noted that quenched effluent 125 can also include coke particles. Such coke particles can either exit with steam cracker tar product 137, or can accumulate in separator 130. In some aspects, the separated effluent can be at a temperature of 300° C. or less prior to entering the pre-coolers 140. The separated effluent 135 can then be passed into one or more pre-coolers 140 to reduce the temperature of the effluent. Any convenient type of cooling can be used, such as indirect cooling (e.g., using one or more heat exchangers) that can allow for recovery of the heat for use in producing steam, and /or direct cooling (e.g., by adding a quench oil to the separated effluent 135). The one or more pre-coolers can be used to reduce the temperature of the cooled, separated effluent 145 to 250° C. or less, or 200° C. or less, or 160° C. or less, such as down to 140° C. or possibly still lower. The cooling can be carried out indirectly (via one or more heat exchangers), and/or directly, e.g., by injection of a quench fluid into line 145.

The cooled, separated effluent 145 can then be passed into primary fractionator 150. The entry location 152 of separated effluent 145 can be below the level of the intermediate product withdrawal location 158, e.g., below the pump-around region. The intermediate product withdrawal location 158 can correspond to one or more fractionation trays 164 in the fractionation region. A pump-around section 162 including one or more pump-around trays can be located between entry location 152 and fractionation tray(s) 164. In the configuration shown in FIG. 1, liquid can be withdrawn from a withdrawal location 151 and then cooled using heat exchanger(s) 167 (and/or another type of cooler). The cooled liquid can then be returned to a higher location within the tower, such as a location at or above the top of pump-around section 162. Optionally, as shown in FIG. 1, a portion of the liquid from the withdrawal location 151 can be used as the quench oil 122 for quench cooler 120. Alternatively or in addition, a separate bottoms withdrawal location (not shown) can be used to provide quench oil for the quench cooler and/or the pump around. In the aspect shown in FIG. 1, a bottoms withdrawal location 151 is used to provide liquid for the pump-around section 162. In various aspects, the temperature at the location of the lowest of fractionation trays 164 can be 140° C. or less, or 130° C. or less. Although the term "bottoms" is used for illustration, those skilled in the art will appreciate that this fluid stream need not be withdrawn from the bottom of the fractionation column. For example, this stream can be withdrawn from any location in the lower region, but is typically withdrawn from a location below the location where pyrolysis effluent 145 is introduced. Without being bound by any particular theory, it has been discovered that fouling within the primary fractionator 150 can be reduced or minimized by having the feed to the fractionation section of the primary fractionator at a temperature of 140° C. or less prior to contact with the initial fractionation tray (or 130° C. or less). To further assist with temperature management, a naphtha reflux stream 161 can be introduced into fractionation tower 150 at a location above the fractionation trays 164.

In the example shown in FIG. 1, the primary fractionator 150 can generate a product that is withdrawn from location 151, a steam cracker gas oil product 155, and an overhead product 159 that includes gas phase components and steam cracker naphtha. A portion of the steam cracker naphtha from overhead product 159 can optionally be used to provide the naphtha reflux stream 161. In some aspects, the product withdrawn from location 151 can correspond to a bottoms product from the primary fractionator 150. In some aspects, a separate bottoms product (not shown) can be withdrawn from a location below withdrawal location 151. It is noted that maintaining at least some withdrawal of a steam cracker gas oil product from the fractionation tower, e.g., via 158, can assist with reducing the temperature at the lowest fractionation tray to 140° C. or less.

In an alternative aspect, the knockout drum or other separator 130 can be located after the primary fractionator 150, so that a larger volume of bottoms product is separated out in the primary fractionator 150. In such aspects, the product from withdrawal location 151 (or alternatively the separate bottoms product) can be subjected to one or more additional separations (not shown), e.g., to separate steam cracker tar from a remaining portion of the bottoms product. Such additional separations can be carried out in one or more additional separators. Alternatively or in addition, such additional separations can be carried out in a flash zone within primary fractionator 150 before removal of separate bottoms product and/or removal of the product from withdrawal location 151 (as the case may be). After the primary fractionation tower, the resulting products (such as bottoms 151, steam cracker gas oil 155, and overhead product 159) can be further processed in any desired typical and/or conventional manner.

The connectivity in FIG. 1 is representative of fluid communication between the various elements. Fluid communication can include direct fluid communication and indirect fluid communication. In FIG. 1, pyrolysis reactor 110 is shown in direct fluid communication with quench stage 120. Pyrolysis reactor 110 is shown in indirect fluid communication with separator 130 via quench stage 120.

Figure 2:
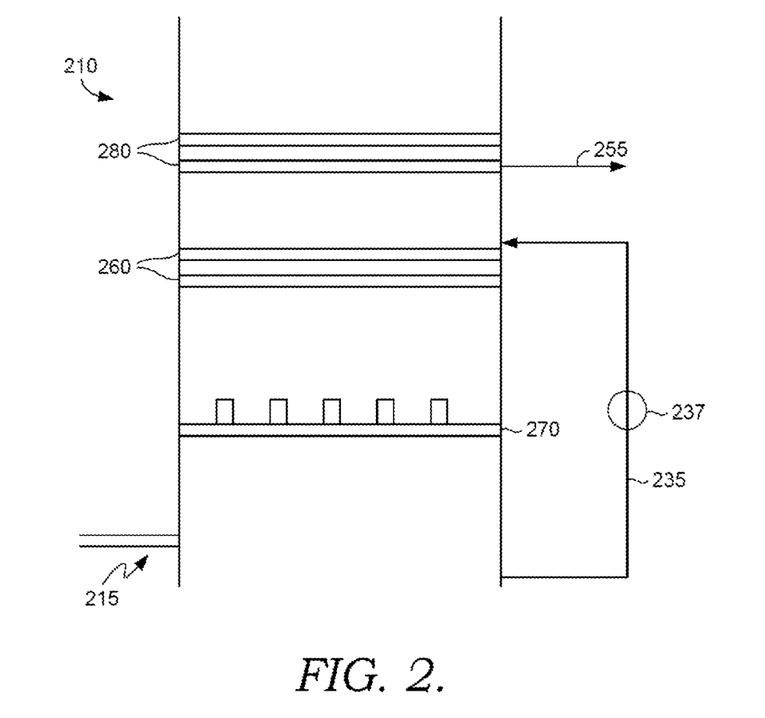
FIG. 2 shows an example of a portion of a primary fractionator tower.

FIG. 2 shows an example of a portion of primary fractionator that includes one or more pump-around trays below the first fractionation tray. In FIG. 2, fractionator 210 includes a feed entry conduit 215 for delivering a feed for fractionation. The location of feed entry conduit 215 is below the other components shown in FIG. 2. Above the feed entry location are one or more vapor flow distributors 270 located in the pump-around region. The bottom of the lowest vapor-flow distributor can define the bottom of the pump-around region. Vapor flow distributors can correspond to any convenient type of flow distributor, such as chimney trays. Above the vapor flow distributors 270 are one or more pump-around trays 260. A pump-around loop 235 can withdraw feed from a lower portion of the fractionator 210 and return the feed into the fractionator 210 at or above the pump-around trays 260. The entrance to the pump-around can be located below the level of 215, at the level of 215, or above the level of 215, but is typically below the level of 215 as shown. The pump-around loop 235 also include one or more heat exchangers 237 (or another type of cooling device) to cool the feed. One or more fractionation trays 280 can then be included above the pump-around trays 260, for withdrawal of a steam cracker gas oil fraction 255 from the fractionator 210.

EXAMPLE 1

Vapor Uniformity within Fractionation Trays

Without being bound by any particular theory, it is believed that non-uniformity in the velocity of vapor within fractionation trays can contribute in a significant manner to formation of foulant deposits within the primary fractionator. In particular, non-uniformity in vapor velocity can result in localized low velocity or "stagnant" zones. Such stagnant zones are believed to provide increased residence time for free radicals in a localized area, resulting in increased deposit accumulation in such localized areas. By reducing or minimizing non-uniformity of vapor velocity, a substantial contributing factor to foulant deposit formation can be reduced or minimized.

To investigate non-uniformity of vapor velocity within a primary fractionator, computational fluid dynamic simulations were used to model various internal structure configurations within a primary fractionator. In a baseline configuration, a series of eleven fractionation trays were modeled to determine vapor uniformity for the first tray exposed to vapor within fractionator. The trays were modeled a thin porous media zones with a pressure drop that is believed to be representative of the pressure drop across a fractionation tray during operation when a liquid phase is present in the tray. The size of the pressure drop is due in part to the presence of liquid in the tray. The model also included a chimney tray for vapor distribution below the first tray. In the model, the feed to the fractionator was introduced below the chimney tray. Additional models were also constructed to replace from one to five of the fractionation trays with pump-around trays. The pump-around trays were also modeled as thin porous media zones, but with a higher representative pressure drop, due in part to the increased amount of liquid in the pump-around trays relative to fractionation trays. It is noted that the amount of pressure drop in a tray can impact the vapor distribution.

Table 1 shows results from steady state simulations regarding uniformity at the first fractionation tray. In Table 1, "PA" refers to the number of pump-around trays included in a modeled configuration. The "$1^{st}$ tray" refers to the number of the fractionation tray that corresponds to the first fractionation tray exposed to vapor from the effluent. The average velocity across a tray is represented by "U". The area-weighted standard deviation of the velocity is represented by "Uσ". In order to characterize the amount of variation in velocity, the area-weighted standard deviation can be divided by the average velocity to generate a covariance, referred to in Table 1 as "COV". The covariance value was then used to generate a uniformity index, corresponding to 1−COV.

TABLE 1

Vapor Uniformity at First Fractionation Tray

| # PA Trays | $1^{st}$ Fractionation Tray | COV = Uσ/U | Uniformity index (1 − COV) |
| --- | --- | --- | --- |
| 0 | Tray 11 | 0.33 | 0.67 |
| 1 | Tray 10 | 0.01 | 0.99 |
| 2 | Tray 9 | 0.01 | 0.99 |
| 3 | Tray 8 | 0.01 | 0.99 |

TABLE 1-continued

Vapor Uniformity at First Fractionation Tray

| # PA Trays | 1st Fractionation Tray | COV = Uσ/U | Uniformity index (1 − COV) |
|---|---|---|---|
| 4 | Tray 7 | 0.02 | 0.98 |
| 5 | Tray 6 | 0.01 | 0.99 |

As shown in Table 1, with only a chimney tray below the first fractionation tray, the computational fluid dynamic simulations showed that the uniformity index at the first tray was 0.67. This indicates a substantial amount of variation in the velocity across the first tray. By contrast, including at least one pump-around tray between the first fractionation tray and the chimney tray resulted in a uniformity index of 0.98 or more. It is noted that for the model configurations including at least one pump-around tray, the uniformity index for the first pump-around tray was also 0.67. However, the pump-around trays have lower susceptibility to fouling.

Based on the results in Table 1, having at least one pump-around tray prior to the first fractionation tray within the primary fractionator can substantially reduce or minimize vapor maldistribution which can lead to stagnant zones in the fractionation trays, and thereby reduce or minimize the potential for accumulation of foulant deposits.

EXAMPLE 2

Reduction of Free Radical Concentration

Example 1 shows that the presence of at least one pump-around tray can be beneficial for reducing or minimizing foulant deposits. However, further benefits can be gained by using a plurality of pump-around trays, such as 4 or more, or 5 or more. These additional benefits can be achieved by using pump-around trays to reduce or minimize the free radical concentration to roughly equilibrium values in the vapor above a fractionation tray.

At any temperature, an equilibrium concentration of free radicals can be present. The equilibrium concentration of free radicals can vary based on the temperature, and based on the nature of the hydrocarbon or hydrocarbonaceous species present in an environment. At the elevated temperatures present in a steam cracking environment (or other pyrolysis environment), there can be an appreciable concentration of free radicals at the primary fractionator inlet. Additionally, the presence of elevated temperatures can assist with achieving an equilibrium concentration of free radicals rapidly, so that the residence time of a feed within the steam cracking environment is sufficient to roughly achieve an equilibrium concentration.

It has been discovered that the rate of destruction of free radicals at cooler temperatures can be relatively slow under vapor phase conditions. As a result, the equilibrium amount of free radicals is typically not present in the primary fractionator of a conventional steam cracking reaction system.

In order to roughly determine the amount of free radicals present in the primary fractionator, initiation and termination kinetics for free radicals combined with film theory for mass transfer can be performed using styrene as a representative model component. Styrene is selected in part due to the availability of initiation and termination data.

For free radical formation, the sources of free radicals within a steam cracking system include exposure of feed to pyrolysis conditions to form the steam cracking effluent, and potentially at one or more locations downstream of the furnace. The amount of free radicals generated by each of these can vary depending on temperature.

With regard to free radical termination, under existing theory, it is believed that free radical termination primarily occurs when free radicals are transferred to a condensed (liquid) phase. Thus, free radical termination is dependent on mass transfer of generated free radicals to liquid phase. As a result, a non-equilibrium concentration of free radicals can potentially be maintained well into the primary fractionator.

Based on styrene kinetics for initiation and termination, for a primary fractionator with an inlet temperature of 157° C., a free radical concentration in the vapor phase of $5.7 \times 10^{-9}$ moles/liter was calculated. This is in contrast to a vapor phase equilibrium concentration of $8.1 \times 10^{-12}$ moles/liter based on a temperature of 157° C. This difference between the equilibrium concentration and the actual concentration corresponds to roughly three orders of magnitude.

In order to increase the transfer of vapor phase free radicals to the liquid phase and/or to increase the residence time of free radicals in the liquid phase, additional pump-around trays can be included. The pump-around loops associated with the pump-around trays withdraw feed from near the bottom of the fractionator, cool the withdrawn feed, and then introduce the cooled feed into an intermediate location in the fractionator that is below the fractionation trays.

Figure 3:
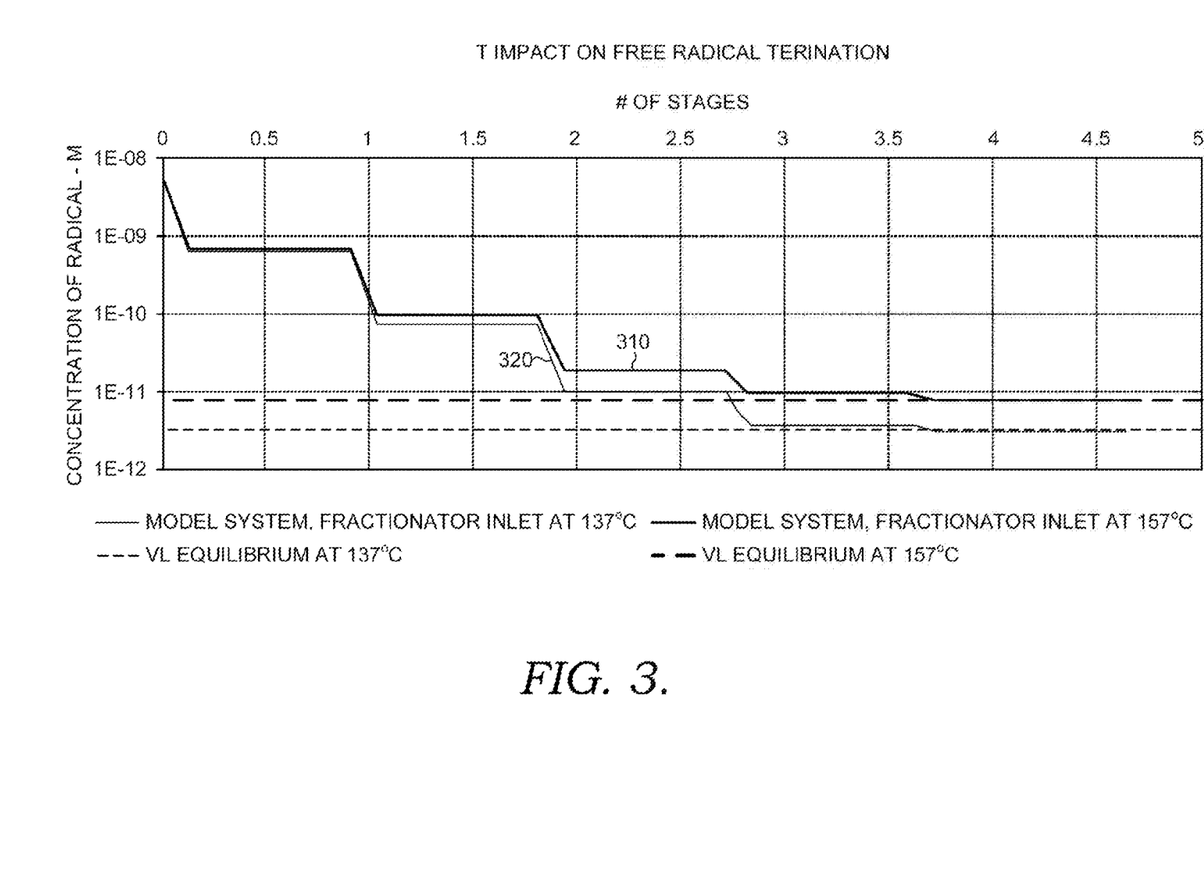
FIG. 3 shows calculated values for free radical concentrations in a primary fractionator at locations below the fractionation trays.

FIG. 3 shows the results of this calculation for a model system at a fractionator inlet temperature of 157° C. As shown by the top line 310 in FIG. 3, including three pump-around stages reduced the vapor phase free radical concentration to a value that was near $1 \times 10^{-11}$ moles/liter, while inclusion of four stages resulted in a concentration close to the equilibrium value (indicated by line 331). At five stages, the free radical concentration at the first fractionation tray was calculated to be the equilibrium value. Based on the vapor phase free radical concentration, including three or more pump-around stages (or four or more, or five or more) can substantially reduce foulant deposits by reducing the free radical concentration in vapor that reaches the fractionation trays.

FIG. 3 also shows that the reduction of free radical vapor phase concentration to the equilibrium amount is not sensitive to small temperature changes within the primary fractionator. Line 320 corresponds to the vapor phase free radical concentration for a fractionator inlet temperature of 137° C. As shown in FIG. 3, the number of pump-around stages needed to reach the vapor phase equilibrium amount of vapor phase free radicals (line 332) is similar at a temperature of 137° C. to the number of pump-around stages needed at 157° C.

When numerical lower limits and numerical upper limits are listed herein, ranges from any lower limit to any upper limit are contemplated. While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

The present disclosure has been described above with reference to numerous embodiments and specific examples. Many variations will suggest themselves to those skilled in this art in light of the above detailed description. All such obvious variations are within the full intended scope of the appended claims.

The invention claimed is:

1. A method for processing a pyrolysis effluent, comprising:

separating a pyrolysis effluent to form a tar-containing stream and a remaining separated effluent;

passing at least a portion of the remaining separated effluent to a fractionation column without passing a portion of the tar-containing stream into the fractionation column, wherein the fractionation column includes, (a) a lower region, (b) a pump-around region located above the lower region, wherein the pump-around region includes one or more vapor-liquid contactors, (c) a vapor-distribution region located above the pump-around region, and (d) a fractionation region located above the vapor-distribution region, wherein the fractionation region includes one or more vapor-liquid contactors;

introducing the at least a portion of the remaining separated effluent into the lower region at a lower region entry location;

withdrawing a fluid stream from the lower region at a location that is below the lower region entry location;

conducting at least a vapor from the lower region upward through the pump-around region to distribute the vapor;

conducting the distributed vapor upward into the vapor-distribution region and toward the fractionation region;

cooling at least a portion of the withdrawn fluid stream, and introducing at least a portion of the cooled fluid stream into the vapor-distribution region; and disengaging in the fractionation region a substantially liquid phase from the distributed vapor phase, passing at least a remainder of the distributed vapor phase upward away from the fractionation region, and conducting at least a portion of the disengaged liquid out of the fractionation column, wherein the at least a portion of the remaining separated effluent is cooled to a temperature of $140°°$ C. to $160°$ C. prior to passing the at least a portion of the remaining separated effluent into the fractionator.

2. The method of claim 1, wherein the vapor-liquid contactors of the fractionation region include a lower vapor-liquid contactor for receiving distributed vapor from the vapor-distribution region, wherein the lower vapor-liquid contactor has a temperature of $\leq 140°$ C.

3. The method of claim 2, wherein the lower vapor-liquid contactor has a temperature in a range of from $100°°$ C. to $140°$ C.

4. The method of claim 1, further comprising introducing a naphtha boiling range fraction into the fractionation tower above the fractionation region.

5. The method of claim 4, further separating from the remainder of the distributed vapor phase a product naphtha boiling range fraction and a fourth fraction having a lower boiling point than the product naphtha boiling range fraction.

6. The method of claim 1, wherein the pyrolysis effluent comprises at least a portion of a steam cracking effluent.

7. The method of claim 6, further comprising:

performing steam cracking on a liquid steam cracking feedstock;

quenching the steam cracking effluent; and separating a pyrolysis tar from the quenched steam cracking effluent before introducing the quenched steam cracker effluent into the fractionation column as the pyrolysis effluent.

8. The method of claim 7, further comprising cooling the steam cracking effluent before separating the pyrolysis tar.

9. The method of claim 1, wherein the pump-around region includes at least one chimney tray below the vapor-liquid contactors of the pump-around region.

10. The method of claim 1, wherein the liquid disengaged in the fractionation region comprises a gas oil fraction.

11. The method of claim 1, further comprising recovering water and/or naphtha from at least a portion of the remainder of the vapor phase conducted upward away from the fractionation region.

* * * * *